United States Patent

[11] 3,580,139

| [72] | Inventor | Robert F. Rasmussen |
| | | Brooklyn Center, Minn. |
| [21] | Appl. No. | 813,018 |
| [22] | Filed | Apr. 3, 1969 |
| [45] | Patented | May 25, 1971 |
| [73] | Assignee | Honeywell Inc. |
| | | Minneapolis, Minn. |

[54] CONTROL APPARATUS
11 Claims, 8 Drawing Figs.

[52] U.S. Cl.................................................. 91/411,
91/412, 244/78

[51] Int. Cl........................................................F15b 18/00,
B64c 13/42

[50] Field of Search............................................91/411, 411
(A), 412; 244/78, 85, 77.7; 92/152

[56] References Cited
UNITED STATES PATENTS

| 2,103,530 | 12/1937 | Henry.............................. | 60/52X |
| 2,616,264 | 11/1952 | Grant et al..................... | 91/412 |
| 2,970,443 | 2/1961 | Springham..................... | 244/85X |
| 3,138,002 | 6/1964 | Ernst et al...................... | 244/78X |

Primary Examiner—Edgar W. Geoghegan
Attorneys—Charles J. Ungemach, Ronald T. Reiling and Gordon Reed ABSTRACT: Conventionally, in aircraft having fluid operated servomotors for positioning the control surfaces, aircraft engine driven pumps supply the operating fluid pressures for the servomotors while the aircraft is in flight.

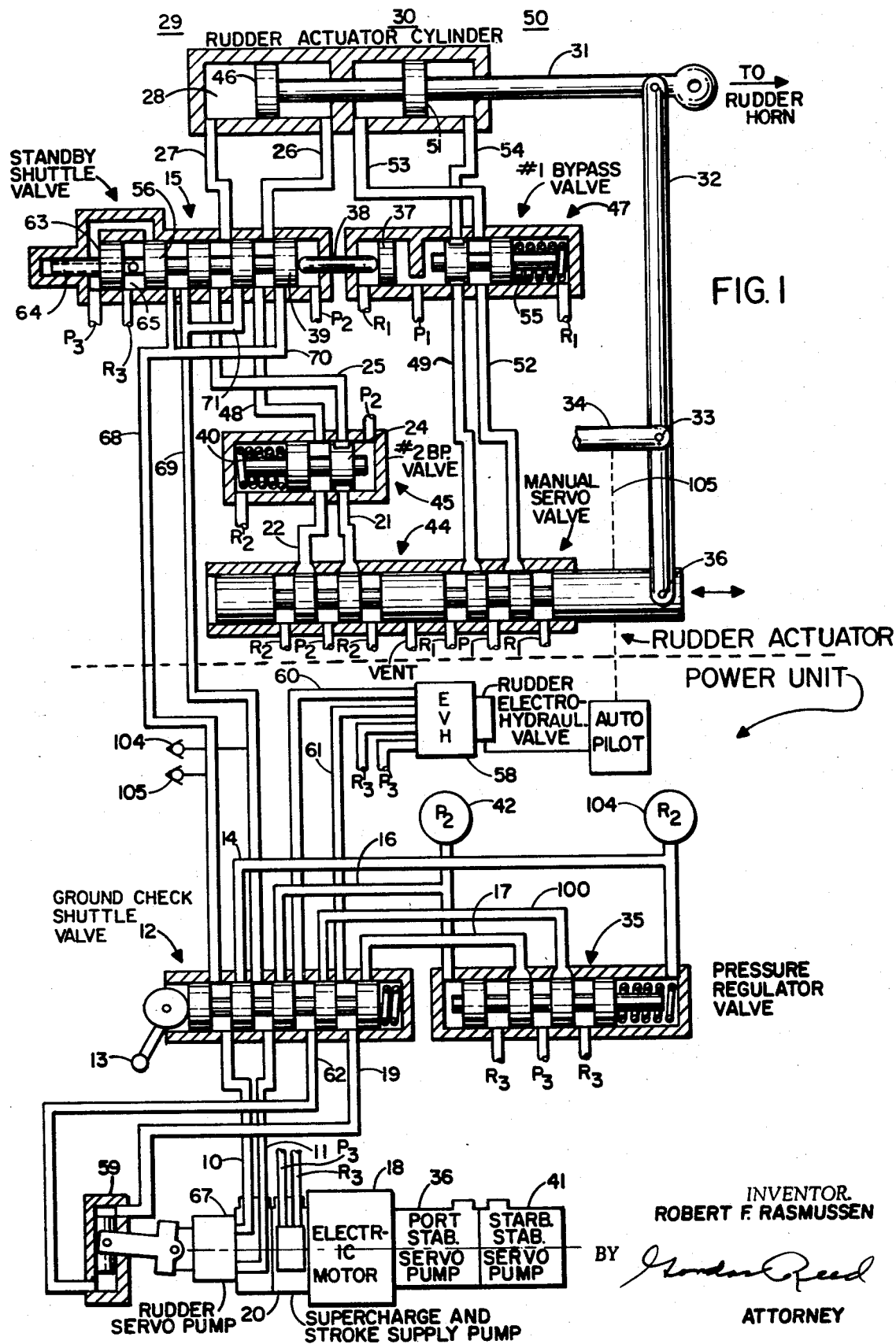

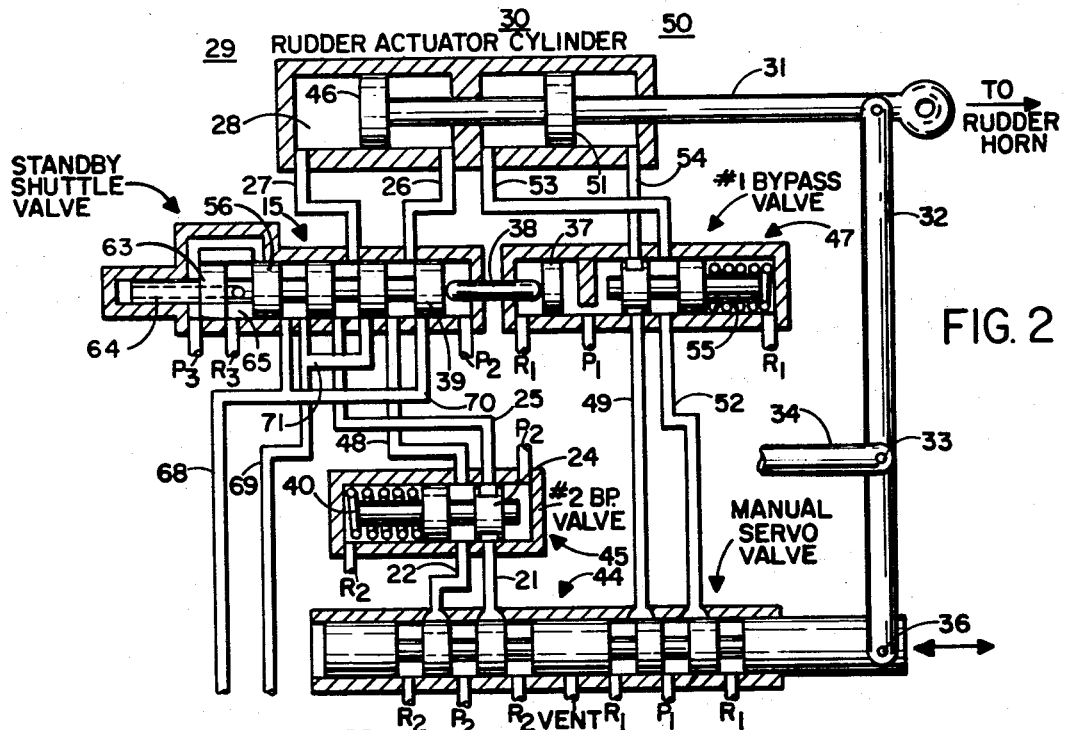
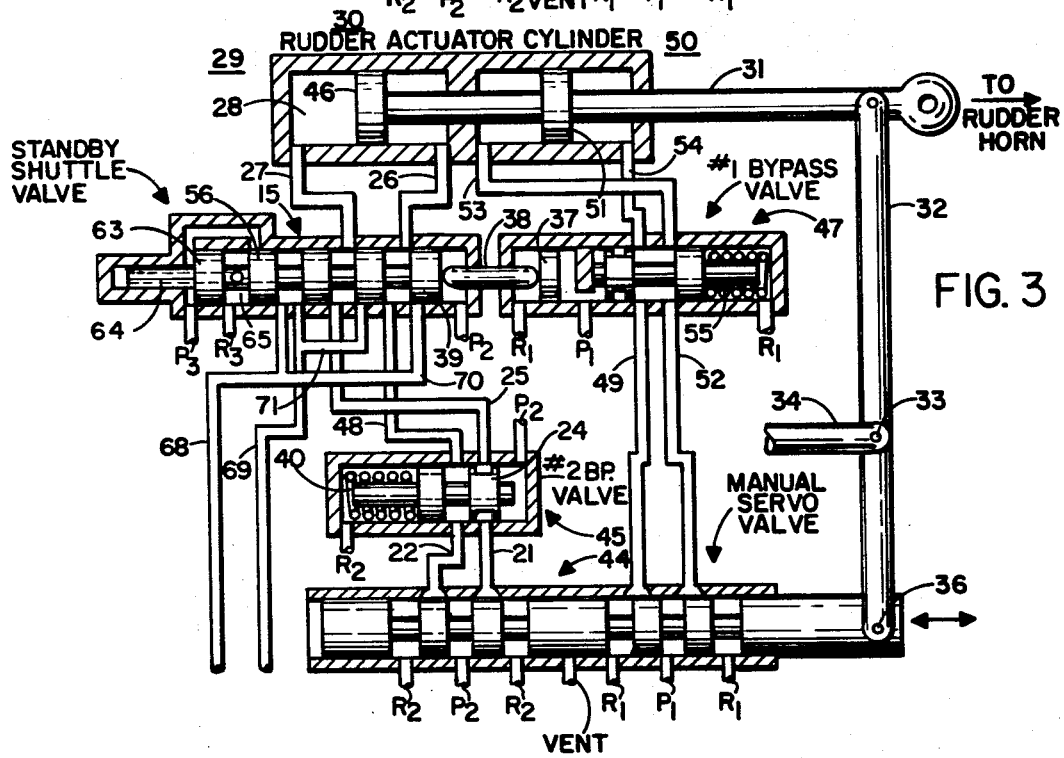

INVENTOR.
ROBERT F. RASMUSSEN
BY *Gordon Reed*
ATTORNEY

CONTROL APPARATUS

During preflight or ground checkout of the operativeness of the servomotors when the engines of the craft are not operating an electric motor herein may be energized for operating a separate fluid pressurization pump to supply pressurized fluid to such servomotors, to determine if the servomotors are operating so that flight may be undertaken. The pump pressure is maintained at a near constant magnitude. In the present arrangement an electric motor-operated pump during flight is also used as a standby or reserve control system pressure source and is interlocked with the engine driven pumps and control valves for the servos so that upon failure of conventional engine driven fluid pressure sources the standby fluid pressure system is automatically effective to operate the servos, to increase reliability of the aircraft and enable it to continue flight.

BRIEF SUMMARY OF THE INVENTION

A hydraulic tandem piston type rudder control surface actuator for example includes a cylinder 30 which houses in its left end a piston type servo section 29 and in its right end a piston type servo section 50, with the pistons connected to a common output rod 31 connected to the rudder surface operating horn. The section 29 is connected through a novel standby shuttle valve and a number 2 bypass valve to output conduits of a manually positioned seven land plug type servo valve 44 which has a left portion as indicated connected to a fluid pressure and return source $P_2$ and $R_2$ for control of servo section 29.

The right servo section 50 has conduits extending therefrom through a number 1 bypass valve to a right portion of the manual servo valve 44 which effects the porting of pressure fluid from a fluid pressure source $P_1$ and return $R_1$ to section 50. Manual means 34 are provided for positioning or displacing the manual servo valve 44 from a null position and the manual servo valve is repositioned through a followup arrangement from the output rod 31 of the main rudder actuator.

During ground check operations, when the aircraft engine driven pumps that in flight supply pressures $P_1$ and $P_2$ are inoperative, and electric motor 18 is energized to drive a supercharge and stroke supply pump 20 and also a rudder servo pump 67 that supplies the preflight fluid pressure. The output $P_3$ of the supercharge and stroke supply pump 20 operates a standby shuttle valve. With a manually operated ground check shuttle valve 12 selectively moved to its operated position, the rudder servo pump pressurized fluid is transmitted through the manually operated ground check shuttle valve 12 and suitable conduits to apply pressure fluid to the servo section 29. In this manner the operation of the section 29 may be effected to indicate satisfactory preflight operation of the rudder actuator section 29 in cylinder 30. In other words, the output of the rudder servo pump 67 during ground check is transmitted through the manually positioned ground check shuttle valve 12 and through fluid conducting connections ordinarily pressurized by differential pressure $P_2$, $R_2$ and thence through the manually operated servo valve and the number 2 bypass valve and through the standby shuttle valve in its operated position to opposed sides of piston 46 of section 29. Thus by movement of a manual controller to position the manual servo valve 44, operation of section 29 may be effected.

When the aircraft is airborne the engine driven pumps supply the pressures $P_1$ and $P_2$ whereby if $P_1$ or $P_2$ be available the standby shuttle valve is moved to inoperative position interrupting control of section 29 from the output of the rudder servo pump 67.

With the ground check shuttle valve moved to its unoperated position or toward the left in FIG. 1 and with the electric motor 18 still operating the pressure $P_3$ may be supplied to the standby shuttle valve to control its position in opposition to the pressure $P_2$ and $P_1$ via the connecting rod 38 and piston 37. Upon joint or overlapping failure of pressures $P_2$ and $P_1$ the standby shuttle valve is moved by pressure $P_3$ to its operated position; consequently, the output of the rudder servo pump 67 is supplied through the operated standby shuttle valve 15 to opposed sides of piston 46 of section 29. The pressurizing of opposed sides of piston 46 during failure of $P_1$ and $P_2$ while in flight, to provide proper aircraft control is controlled by an electrohydraulic valve EHV 58. This EHV, depending upon its displacement in either direction from a null position in accordance with an electric control signal supplied thereto varies the relative output pressures of the two output lines or conduits of the rudder servo pump 67 whereby operating fluid pressure may be applied either to the left side of piston 46 or to the right side to reversibly control the rudder. The system is thus fail operative after two distinct failures.

A similar arrangement driven by the electric motor may be provided for the roll axis and also a similar arrangement may be provided for the pitch axis of the three channel control system for an aircraft by means of servo pumps 36 and 41.

DESCRIPTION OF SEVERAL VIEWS OF THE DRAWING

FIG. 1 shows in the upper portion a rudder control surface actuator package and in the lower portion its associated novel standby power unit;

FIGS. 2—5 show the rudder actuator in various modes, thus;

FIG. 2 shows the rudder actuator package of FIG. 1 in a normal mode with the two servo sections while in flight controlled respectively by pressures $P_1$ and $P_2$ operating normally; the standby power unit that supplies pressure $P_3$ is available but not supplying any pressure;

FIG. 3 shows the rudder surface actuator package in a second mode or condition with the pressure $P_1$ having failed but $P_2$ present, and the standby system available;

FIG. 4 shows the aircraft rudder surface actuator package in a third mode with the system operated by pressure $P_1$, the standby system is available, and pressure $P_2$ failed;

FIG. 5 shows the rudder actuator package in a fourth mode with pressures $P_1$ and $P_2$ having failed and the standby power unit developing differential pressures $P_3$ and $R_3$ which as modulated by the EHV are now in control of the rudder surface actuator package;

DETAILED DESCRIPTION

Figure 4:
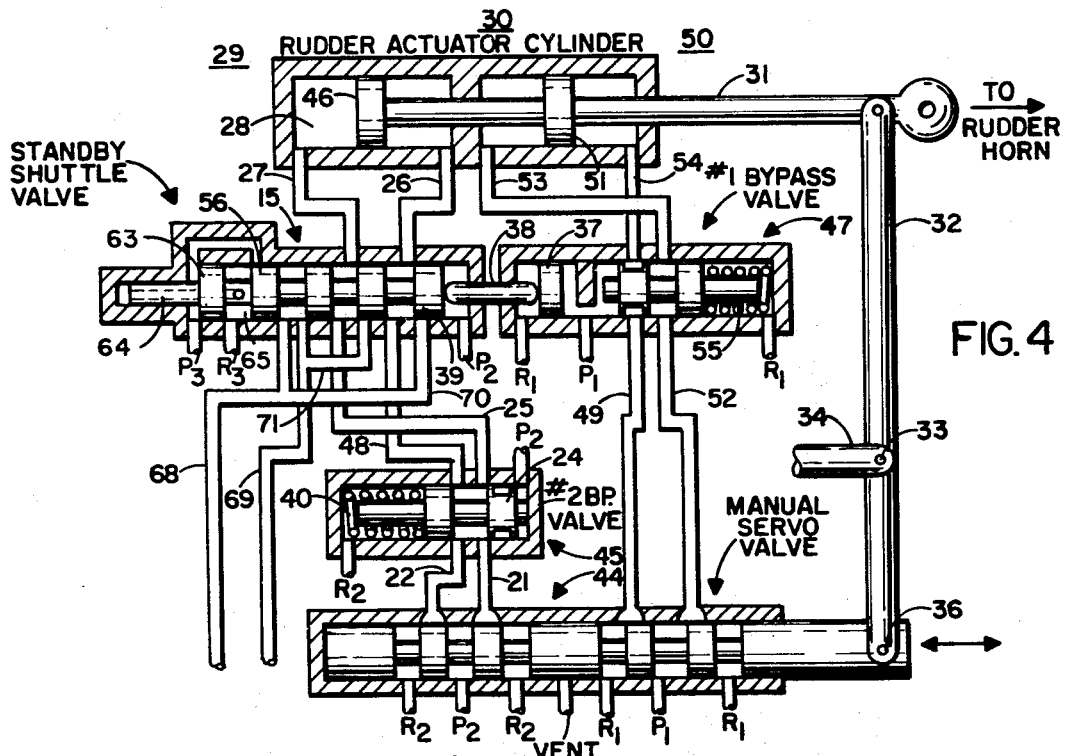

Referring to FIG. 1, a rudder actuator package and its related standby power unit is disclosed therein, and it is to be understood that such actuator package could also be provided for the roll control surfaces of an aircraft and/or the pitch control surfaces of an aircraft. Considering firstly the features of the rudder actuator package that are probably old in the prior art the rudder actuator package includes a rudder actuator cylinder 30 having tandem servo sections 29, 50 connected to a common output rod 31 that in turn operates the rudder surface of the aircraft. Section 29 includes a piston 46 and section 50 includes a piston 51. Differential pressures $P_2$, $R_2$ are supplied through a manual servo valve 44, conduits 21 and 22, a number 2 bypass valve 45, conduits 25 and 48, and disregarding a standby shuttle valve for the moment, through conduits 26, 27 to opposed sides of piston 46. Similarly, differential fluid pressures $P_1$, $R_1$ are supplied to opposed sides of piston 51 through manual servo valve 44, conduits 49 and 52, through a number 1 bypass valve 47, conduits 53 and 54. Pressures $P_1$ and $P_2$ are supplied from pressure sources not shown, but they are aircraft engine driven pumps conventionally. Briefly $P_1$ and $P_2$ are applied through the number 1 and number 2 bypass valves 45, 47 to opposed sides of pistons 46, 51 through the manually positioning of a manual operated plug type servo valve 44.

Valve 44 at one end is pivoted at 36 to a differential followup lever 32 connected at its opposite end to the actuator output rod 31. Intermediate the ends of lever 32 is a pivoted connection 33 operably connecting it with a manually operable member 34 of the aircraft. Thus as the member 34 is displaced from a null position manually operable valve 44 is displaced from a normal position and fluid is supplied to pistons 46 and 51, shown in tandem, to effect operation of rod 31. A followup action is applied to valve 44 by differential lever 32 to terminate operation of the pistons.

It is probably old in the art to have a bypass valve such as valve 47 which on failure of pressure $P_1$ causes the positioning of a plug valve to interconnect the opposed sides of piston 51 for free operation thereof by actuation of piston 46. Similarly it is old to provide a number 2 bypass valve such as 45 which on loss of pressure $P_2$ results in a spring 40 moving the plug member of valve 45 to a position whereby the opposed sides of piston 46 are interconnected for free operation thereof by piston 51.

The novel features herein pertain to the provisions of a five land standby shuttle valve 15 and its relation to the two land number 1 bypass valve 47 and the two land number 2 bypass valve 45 as well as to the standby power unit shown in FIG. 1 below the broken line therein.

The standby power unit which functions in preflight and in flight for increasing actuator system reliability comprises an aircraft mounted electric motor 18 which drives a supercharge and stroke supply pump 20 and a rudder servo pump 67. Additionally, the electric motor 18 to show its application to a three axis control system also drives a port stabilator servo pump and a starboard stabilator servo pump for other control surfaces. The rudder servo pump 67 has fluid transmission conduits 10, 11 extending therefrom. A differential fluid pressure may exist in conduits 10 and 11. This differential pressure in the standby mode as to magnitude and phase, meaning the pressure in either conduit may be greater than that in the other, is adjusted by the stroking cylinder 59. Stroking cylinder 59 for this purpose has a piston therein, to be hereinafter described, controlled by a differential fluid pressure in conduits 19, 62 extending to opposite ends of the stroking cylinder 59. Conduits 19, 62 are connected to conduits 60, 61 extending from an electrohydraulic servo valve 58 when a manually operable preflight or ground check shuttle valve 12 is in its standby position termed also in-flight position or extreme leftward position as shown in FIG. 1. The electrohydraulic valve 58 is responsive to conventional electrical autopilot control signals supplied by aircraft flight condition sensors as well as electrical signals supplied by a signal generator operated by the manually operable means 34. The electrohydraulic valve 58, as conventional, assumes a displacement from a normal position in accordance with the sum of electric signals which energizes its torquer. This positioning of the electrohydraulic valve 58 in accordance with the sum of the electrical signals results in a modulation of the differential pressures $P_3$, $R_3$ supplied thereto. The differential pressures coming from the electrohydraulic valve 58 are applied to conduits 19, 62 which control stroking cylinder 59 and thereby control the output of rudder servo pump 67 in the standby mode.

The output conduits 10, 11 of the rudder servo pump supply fluid through the manually operable ground check shuttle valve 12 and thence through a fluid pressure operated standby shuttle valve 15 to opposite sides of the piston 46 of section 29 of the rudder actuator package. Thus in the standby mode, rudder servo pump 67 acts as a reserve source of operating pressure for section 29.

Associated with conduits 68, 69 are two check valves 104, 105 connected in turn to two pressurized lines connected to pressure source $P_3$ so that the fluid pressures in conduits 68, 69 are never less than pressure $P_3$.

While the manually operable ground check shuttle valve 12 is shown in FIG. 1 in the in-flight position, yet for ground check purposes of the rudder actuator and other components operated by the $P_2$ system, it may be moved by its operating arm 13 to the right against the opposition of a return spring. The output of rudder servo pump 67 is thereby through conduits 10, 11 supplied to conduits 14, 16 to supply pressures to opposite ends of a pressure regulator valve 35 that normally or in flight receives pressures from an engine driven pump supplying differential pressures $P_2$ and $R_2$. Pressure also is supplied to the portion of the rudder actuator which in flight receives differential pressures $P_2$, $R_2$ at junctions 42, 104.

The rudder servo pump pressure regulator valve 35 functions only when valve operator arm 1 is in its clockwise position and thus when there is consequently no pressure $P_2$ since the aircraft engines are not operating. If the spring in the pressure regulator 35 tends to move the plug valve leftwardly even slightly, pressure $P_3$ from operating pump 20 is applied through valve 35, conduit 17 and thence through the operated ground check shuttle valve 12, conduit 19 to the stroking cylinder 59. At the tim conduit 100 is connected through the pressure regulator valve 35 to return $R_3$, and upstream conduit 100 is also connected through the operated ground check shuttle valve 12 to conduit 62 to the opposite side of the stroking cylinder 59. Thus the piston within stroking cylinder 59 is positioned in accordance with the differential pressure $P_3$-$R_3$.

This adjustment of cylinder 59 results in the rudder servo pump 67 supplying an output on conduits 10, 11 in accordance with the differential displacement of the piston of stroking cylinder 59. Conduit 10 is connected through the operated ground check shuttle valve 12 to conduit 14 and thence to one end of the pressure regulator valve 35; conduit 11 is connected through the ground check shuttle valve 12 to conduit 16 and thence to the left end of the valve 35. The pressure from pump 67 on the left end of valve 35 may be sufficient to move the plug member of rudder servo pump pressure regulator valve 35 to the right whereby a balanced position of equal forces on opposite ends of the valve 35 is provided. It is evident that when the force on the left end of the valve 35 exceeds that of the spring on the right end, the pressure $P_3$ is applied to conduit 100 and thence through the shuttle valve 12 to the stroking cylinder 59 and consequently the output pressure from the rudder servo pump to conduits 10, 11 thereby modifying or reducing the relative pressure on the opposed ends of the pressure regulator valve. A preset pressure from rudder servo pump 67 is thereby provided during preflight or ground checkout.

The rudder channel supercharge and stroke supply pump 20, FIG. 1, supplies the pressure $P_3$ and a return $R_3$. In the standby mode the pressure $P_3$ and return $R_3$ are modulated through the operation of the electrohydraulic valve 58 to modulate the position of the piston in stroking cylinder 59 thereby modifying the output of the rudder servo pump 67. Thus at this time and in the event of a failure of pressures $P_1$ and $P_2$ the output of the rudder servo pump 67 is applied to operate the piston 46.

Figure 6:
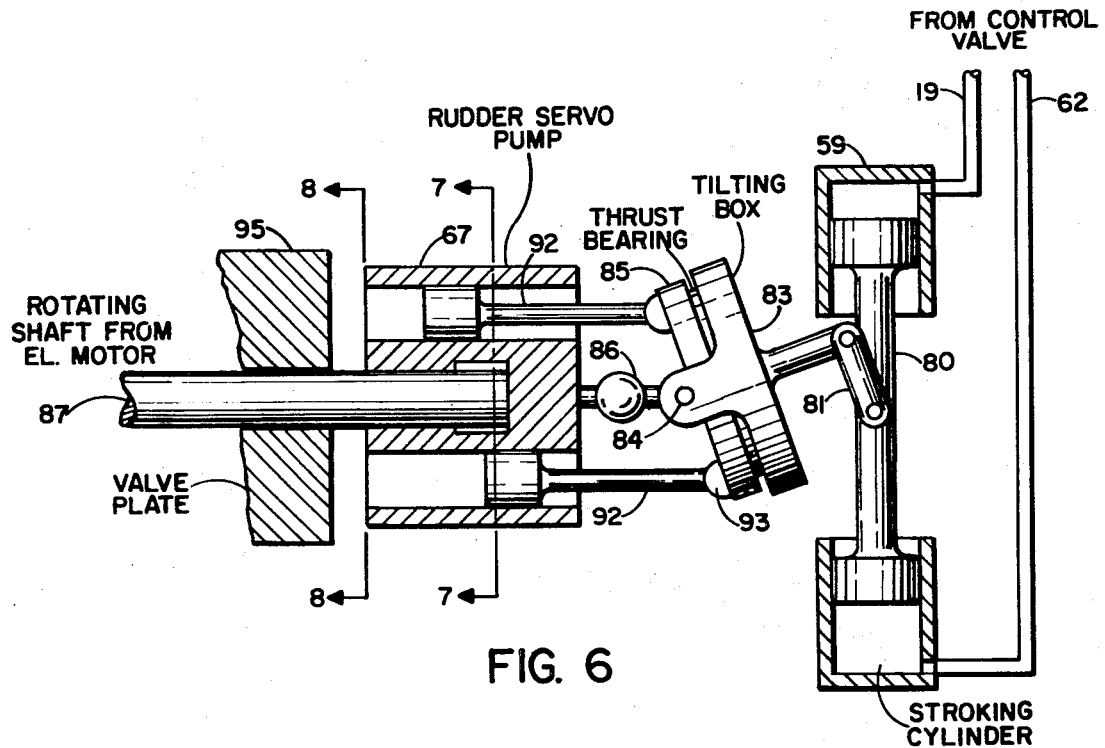
FIG. 6 shows a known multiple cylinder piston type rudder servo pump and its associated stroking cylinder in detail.
Figure 8:
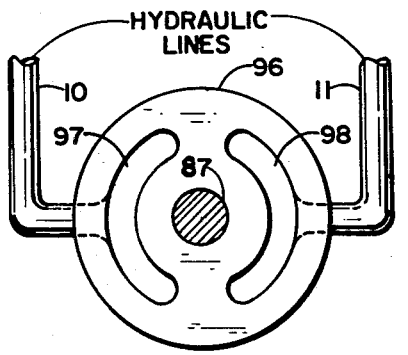
FIG. 8 shows the discharge port plate and its output connections to which the rudder servo pump supplies its outputs.
Figure 7:
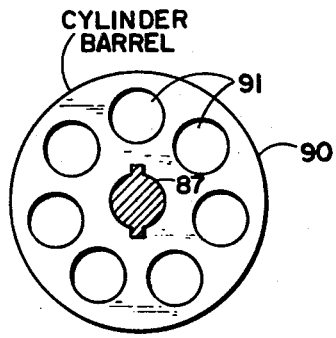
FIG. 7 shows a cylinder portion of the rudder servo pump in cross section detail.

One well known arrangement not original with the applicant here whereby the stroking cylinder 59 varies the output of the rudder servo pump 67 is shown rather generally in FIG. 6 with some elements of the arrangement of FIG. 6 shown in detail in FIG. 7 and 8. In FIG. 6, the stroking cylinder 59 at the right has input connections 19, 62 extending therefrom. These connections 19 and 62 carry a differential pressure which operates a double ended piston 80. Movement of this piston 80 through a linkage 81 operates a tilting but not rotatable box 83 pivoted on a housing bearing 84. Coacting with the pump stroke length controlling tilting box 83 is a rotatable and tiltable member 85 connected through a universal joint 86 to the electric motor driven shaft 87, for rotation thereby. Intermediate member 85 and the tilting box 83 suitable thrust bearings may be arranged. The rudder servo pump 67 as shown in FIG. 7 includes a cylinder barrel member 90 keyed to motor driven shaft 87. The cylinder barrel includes a plurality of cylinders 91 which receive for operation therein pistons or plungers 92 pivoted at 93 to the member 85.

It will be evident that with the member 85 tilted as shown in FIG. 6 that when a plunger or piston connected thereto is in the lower position as shown in one instance such plunger is in the suction part of its cycle and when it has rotated 180° from the lower position and is in the upper position, it is in the pressure or discharge operation of its cycle. The suction and pressure is applied to a ported member 96, FIG. 8, which is arranged between the end of barrel 90 of rudder servo pump 67 and a valve plate 95. The ported member 96 has semicircular ports 97, 98, one connected say to a section line 10 and the other to a pressure line 11. It will be evident that depending upon the direction of tilt of the member 85 by operation of the piston 80, line 10 may be the pressure line in one instance of tilt and with a different tilt it may be a suction line.

While but two pistons or plungers 92 are shown in FIG. 6 it will be understood that there is a plunger or piston provided for each of the holes 91 in the cylinder barrel 90 in member 90 of the rudder servo pump.

It should be understood that while the stroking cylinder and tilting box along with the rudder servo pump has been shown, a similar arrangement is provided for the other control axes of the aircraft such as for the roll axis and pitch axis.

While the arrangement in FIG. 6 may be considered an axial piston type whereby the pressures in conduits 10 and 11 may be varied in accordance with a control signal on electrohydraulic valve 58, FIG. 1, other embodiments of such control may be used. Furthermore, since the stroking cylinder and its relationship to pump stroke length control is well known and details thereof are unimportant here, they have been merely schematically shown and described enough to provide the principles of one control arrangement.

The joint operation of the combined rudder actuator package and standby power unit in various modes will be hereinafter described. As a preliminary, however, by reference to FIG. 1, it is evident that there are three pressure sources $P_1$, $P_2$, and $P_3$. Pressure $P_1$ is used only to pressurize section 50 and thus to power the control surfaces such as the rudder of the aircraft. Pressure $P_2$ is used not only in pressurizing section 29 thereby powering the control surfaces of the aircraft such as the rudder but is also used to operate other devices (not shown) on the aircraft such as bomb bay doors, retract landing gear, operate flaps, etc. The third pressure $P_3$ is used to control valve 15 and thus pump 67 as a "standby" or reserve pressure source.

When in flight, there is an aircraft engine driven pump or pumps for supplying pressure $P_1$ for all of the control surfaces such as rudder, aileron, and elevator of a conventional aircraft. Similarly there is an engine driven pump or pumps on the aircraft for supplying the pressure $P_2$ operating ailerons, rudder and elevator. Pressure $P_3$ is provided by an electric motor 18, FIG. 1, which drives two pumps 20, 67 as stated, one pump 20 supplying a source of pressure $P_3$ and a second pump or rudder servo pump 67 that provides pressure for ground check or preflight purposes to the system that is pressurized in flight only by the pressure $P_2$. The points of application of differential pressure $P_2$, $R_2$ that are common to pump 67 are represented by 42, 104 the first representing $P_2$ the latter $R_2$.

GROUND CHECK

During ground check of the operation of the rudder actuator package, simultaneously with the aileron and elevator packages, the ground check shuttle valve actuator 13 is rotated clockwise from the position shown in FIG. 1 thus moving the associated plug valve thereof rightwardly. The electric motor 18 is operated to drive the supercharge and stroke supply pump 20 supplying pressure $P_3$, and the motor 18 also drives the rudder servo pump 67. As stated above additionally, the electric motor also drives a port stabilator servo pump 36 and a starboard stabilator servo pump 41.

The rudder servo pump 67, from FIG. 1, is now connected by pressure and return conduits 10, 11 through ground check shuttle valve 12 in operated position to the right, through conduits 14, 16 to opposite ends of the four land pressure regulator valve 35. The higher pressure for the moment is considered as being in conduit 16 and is applied to the left end of the pressure regulator valve 35 and also through junction or connection 42 is applied to the aircraft control system that normally in flight receives the pressure $P_2$. Conduit 14 is connected to return conduit 10 and to the return side of the pump 67. For ground checking at this time therefor, the flap operation, the bomb bay door operation, and other auxiliary features as well as the control surfaces may be tested from the pressure supplied by the rudder servo pump 67, as a substitute for pressure $P_2$.

The pressure from the rudder servo pump 67 in conduit 16 as motor 18 is operating initially moves the three land spool of pressure regulator valve 35 rightwardly. This covers the valve ports receiving differential pressures $P_3$, $R_3$, $R_3$ thereby preventing flow through the valve 35. If, in checkout operation, due to operation simultaneously of several actuators such as those for the bomb bay doors, the wing flaps, and others, the pressure from the rudder servo pump 67 in pressure conduit 16 decreases, the pressure regulator valve 35 is moved leftwardly by its return spring thereby porting pressure $P_3$ through valve 35 to conduit 17 through the ground check shuttle spool valve 12 and conduit 19 to the stroking cylinder 59 to control the stroke of the rudder servo pump 67 to increase the pressure therefrom, thus automatically maintaining a desired pressure from the rudder servo pump in the ground control check out system.

It will be evident that with the rudder servo pump 67 pressurizing the system ordinarily receiving pressure $P_2$ from the engine driven pump that the number 2 bypass valve 45 receives application of the rudder servo pump pressure thereto as shown at the inlet of $P_2$. With respect to the number 2 bypass valve spool 24, it is moved to the position shown in FIG. 1 against its return spring 40. Thus, upon subsequent displacement of the manual servo valve 44, the pressure from junction 42 of the $P_2$ system may pass through a circumferential groove in spool land 24, conduit 25, through the standby shuttle valve 15 in its leftward position and conduit 27 to the left end of piston 46 for operation of the piston rod 31 and the rudder control surface. The application of pressure at the right end of shuttle valve 15 at port $P_2$ maintains the plug member of valve 15 to the left, as shown in FIG. 1. Thus ground checking of the operation of the rudder actuator may be effected.

IN-FLIGHT OPERATION OF THE RUDDER ACTUATOR

Four modes of operation of the rudder actuator package while in flight are considered with respect to FIGS. 2, 3, 4 and 5. When in flight, the aircraft propulsion engines such as jet engines drive the pumps that in flight supply pressures $P_1$ and $P_2$ while reserve or standby pressure $P_3$ is solely supplied by the operation of electric motor 18 which drives the pumps 20, 67. Reference is made to FIG. 2 which shows the position of the standby shuttle valve 15, the number 1 bypass valve and the number 2 bypass valve, with pressures $P_1$ and $P_2$ at normal operating value. The standby system for servo section 29 is available but is not used in the normal mode. With respect to FIGS. 2 through 5, the ground check shuttle valve 12 is in its leftward position with its operator 13 in the extreme counterclockwise position.

If $P_1$ or $P_2$ fail, the resulting operation of valve 45 or 47 will close an energizing circuit for pump 18, by any suitable switch arrangement (not shown), to prepare it for use. The standby or supercharge and stroke supply pump 20 driven by the electric motor 18 is supplying pressure $P_3$ directly as to the left end of the spool or plug member of valve 15 tending to move the plug of standby shuttle valve 15 to the right. However, the plug of this valve remains in its leftward position because of the application of pressure $P_2$ to the right end of the plug of valve 15 and thereby normal operation of section 29 from pressure $P_2$ occurs. In other words, manual operation of the manual servo valve 44 may be effected to control porting therethrough of fluid causing the operation of piston 46 from the pressure source $P_2$. For example, if the manually operated valve 44 be displaced to the right, pressure $P_2$ may pass from connection 42 or a similar pressurized point through the valve, conduit 21, through a number 2 spool type bypass valve 45 (which is in its left position due to the presence of pressure $P_2$ applied to the right end of the bypass valve). The fluid from conduit 21 passes specifically through a peripheral circumferential channel in land portion 24 of the bypass valve, conduit 25, the standby shuttle spool valve 15 to the left end of section 29 of the rudder actuator and the piston rod 31 of cylinder 30 under pressure $P_2$ moves rightwardly to operate a link 32 that is pivoted at 33 to the manually operable link 34 which is restrained from movement. Link 32 is also pivoted at 36 to the manual servo valve 44 thus moving it leftwardly to interrupt the flow of pressure fluid $P_2$ and terminating operation of piston rod 31 of the rudder actuator cylinder 30. The standby pressure in the normal mode does not operate section 29 of the rudder actuator cylinder 30.

The second mode occurs with the loss of pressure $P_2$. It is considered with reference to FIG. 3 of the rudder actuator package. Upon loss of pressure $P_2$, the number 2 bypass valve 45 for rudder actuator section 29 moves to the right under the force of its return spring with a loss of pressure $P_2$ on its right end. The standby shuttle valve 15 however remains in its leftward position. Thereby piston 46 may be readily moved in either direction since opposed sides thereof are interconnected for free passage of fluid. In other words, conduits 26, 27 are interconnected through the standby shuttle valve 15 and the number 2 bypass valve 45.

The spool of shuttle valve 15 remains in its leftward position due to the presence of pressure $P_1$ in the indicated ports in the number 1 bypass valve 47 which causes the leftward displacement of a cylindrical member 37 therein which through the longitudinal operating member 38 drives the spool of standby shuttle valve 15 to its leftward position.

Operation of the manual servo valve 44 ports fluid from pressure source $P_1$ through the number 1 bypass valve and related conduits to opposed sides of piston 51 to effect operation thereof in either direction and thus operation of the rudder control surface.

The third operating mode is reviewed with respect to FIG. 4 when pressure $P_1$ has failed but pressure $P_2$ is still available. Due to pressure $P_2$ being available, the spool of number 2 bypass valve is moved to the left removing free communication between opposed sides of piston 46.

Also, the pressure $P_2$ moves the spool of the standby shuttle valve 15 to its left position or holds it in this left position.

With the loss of pressure $P_1$, the spool of number 1 bypass valve under the influence of its return spring moves to the left thereby providing a free bypass for the fluid on opposite sides of the piston 51 in section 50 of the rudder actuator package.

It is evident how movement of the manual servo valve 44 through the left section thereof associated with differential pressures $P_2$ and $R_2$, ports fluid from the pressure source $P_2$ and with the spool of valve 45 being moved to the left through the circumferential passage in land 24, through the standby shuttle valve to the left side of piston 46 while return is provided from the opposite side of the piston 46 through the standby shuttle valve and through the space between lands of the spool of number 2 bypass valve and the manual servo valve 44 to return $R_2$.

Figure 5:
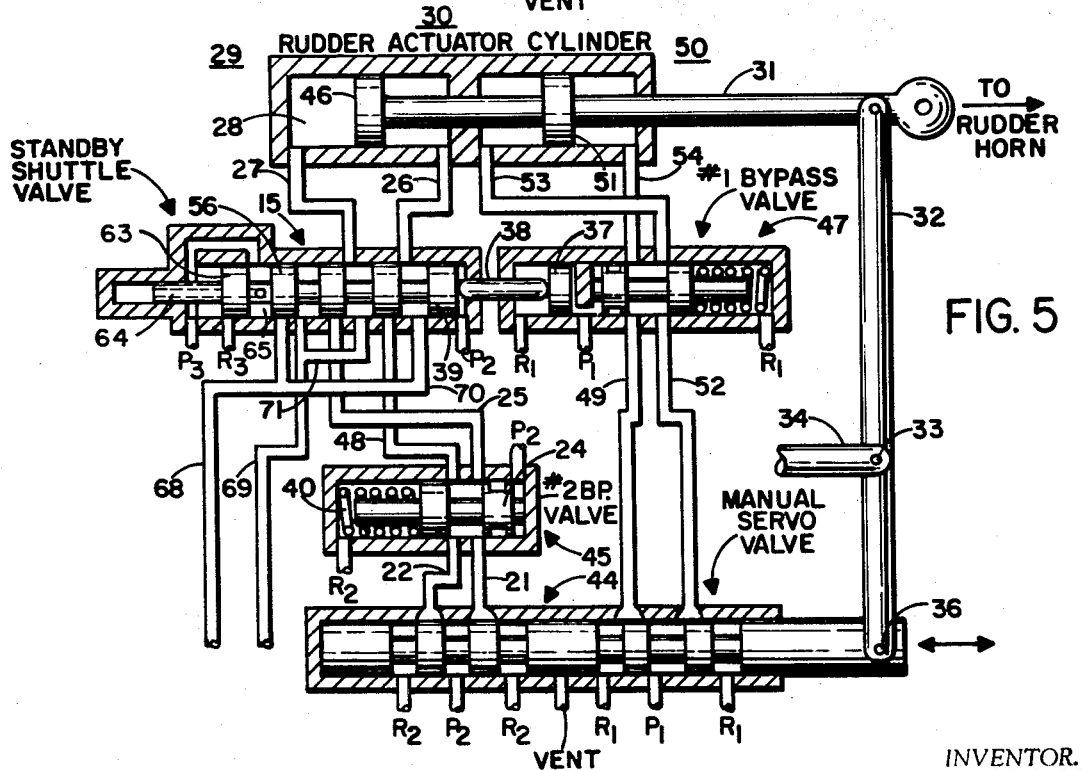

The loss simultaneously or overlapping absence of pressures $P_1$ and $P_2$ is considered with respect to FIG. 5. With such simultaneous or overlapping time absence or loss of both pressures $P_1$ and $P_2$, the spool of number 1 bypass valve 47 moves to the left under the force of its return spring 55 to interconnect opposed sides of piston 51 to equalize the pressures thereon. Similarly, the spool of number 2 bypass valve 45 tends to move to the right under the force of its return spring 40. However, the opposed sides of piston 46 are not at this time interconnected due to operation of the spool of standby shuttle valve 15 directly from pressure $P_3$ that is now available on loss of $P_1$ or $P_2$. Pressure $P_3$ moves the shuttle valve spool to the right, see FIG. 5, blocking off conduits 25, 48 extending from the bypass valve 45, at the shuttle valve.

In other words, the pressure $P_3$ applied as shown to the left end land 63 of the spool of standby shuttle valve 15 causes the valve to move rightwardly without opposition, thus enabling a space 65 between the lands 63, 56 in the spool of shuttle valve 15 to receive pressure $P_3$. The spool of shuttle valve 15 as to detail has a small diameter hollow portion 65 extending rightward from its left end and it has an interconnecting radial opening therein which communicates in turn with space 65 whereby additional pressure is applied to the left end of the portion 64 tending to accelerate the movement of the shuttle valve rightwardly.

While rudder servo pump 67 power piston 46, control of pump 67 from pressure $P_3$ of the rudder actuator package is obtained through the rudder electrohydraulic valve (EHV) 58. This electrohydraulic valve responds to electrical control signals and some signals may be from sensors of the aircraft attitude or the like but one signal is from the existing pilot stick electrical signal generator or stick force transducer of the aircraft or the rudder pedals operated signal generator thereof. Thus press re $P_3$ is supplied into the EHV 58 which, depending upon its position due to the electrical signals, supplies modified $P_3$ pressure to conduits 60, 61 whereby supply pressure is transmitted through the ground check shuttle valve 12 in its left position, conduit 19, to one end of the stroking cylinder 59 or through conduit 62 to the opposite end of the stroking cylinder. The stroking cylinder is thus reversibly controlled in accordance with the differential pressure in conduits 19, 62 and controls the magnitude and direction of output pressure of rudder servo pump 67. Pump 67 thereby varies the magnitude of pressure in conduits 10, 11 and their associated conduits 68 or 69 in accordance with the electrical servocontrol signals applied to the EHV 58. Thus, conduit 68 or conduit 69 is selected as the higher pressure conduit depending on operation of valve 58. From conduit 68 or 69 and pressure subconduits 70, 71 through spacings between lands in the spool of standby shuttle valve 15 and conduits 26 or 27, pressure is supplied to either of opposed sides of piston 46. The pressure on piston 46 moves rod 31 in the one or other direction.

Without the pressures $P_1$ and $P_2$ a so-called mechanical input from link 34 to manual servo valve 35 is ineffective to control the rudder actuator cylinder 30 but an electrical connection is provided for a manual input rather than a mechanical signal to supply in this mode the operation of the rudder actuator package when only pressure $P_3$ is present.

Thus, the standby power unit shown in FIG. 1 is effective to operate the rudder actuator package despite the loss or absence of both pressures $P_1$ and $P_2$, to maintain the rudder actuator package operative despite two failures.

It will now be apparent that there has been provided a novel combination of control surface actuator and standby power unit wherein the standby unit may be resorted to for preflight or ground check out purposes to test the operativeness of any hydraulic equipment. Furthermore, the standby power unit may also be effective during in-flight operations of the control surface actuator to provide standby or reserve operation thereof upon dual pressure failures.

While my invention may be embodied in other specific forms without departing from the spirit or essential attributes thereof, I desire the present embodiment to be considered in all respects as illustrative and not restrictive, reference being had to the appended claims to indicate the scope of the invention.

I claim:

1. A redundant fluid servomotor having plural or redundant operable sections;

first means controlling one section from a first fluid pressure source;

second means for controlling another section from a second fluid pressure source; and third means controlling one of said sections from a third pressure source upon loss of pressure from the first and second fluid sources but rendered ineffective for control by normal pressure from either the first or second fluid source.

2. In a movable vehicle having power means, such as jet engines, primarily for propelling said vehicle and secondarily for supplying fluid pressure and means including a fluid type servomotor or actuator for positioning members on said vehicle for steering thereof, said power means supplying pressure fluid to said servomotor while said vehicle is being propelled, in combination therewith auxiliary means on said vehicle having no propelling function but supplying pressurized fluid to said servomotor upon loss of fluid pressure from the power means.

3. The apparatus of claim 2 wherein said auxiliary means supplies pressurized fluid to said servomotor during nonoperation of said power means for checkout of the operation of the servomotor prior to propulsion of the vehicle.

4. The apparatus of claim 2 including displaceable valve means and wherein the auxiliary means supplies pressure to said servomotor through said valve means, as displaced upon interruption or absence of pressure derived from said operable power means.

5. The apparatus of claim 2 wherein said servomotor has redundant sections wherein said operable power means serves as a fluid pressure source to one section and serves as a second fluid pressure source to a second redundant section and said auxiliary means supplies fluid pressure to one of said redundant sections upon interruption or absence of operation of the operable means.

6. The apparatus of claim 5, including a manually operable servocontrol valve and positioning means therefor controlling said redundant servomotor sections from said operable power means.

7. The apparatus of claim 6, including a standby shuttle valve for connecting the auxiliary means to one section of said redundant servomotor in response to the difference of the pressure from the auxiliary means and that from the operable power means.

8. The apparatus of claim 6, including means operated by the redundant servomotor for repositioning said manual servo valve.

9. The apparatus of claim 7, wherein the servomotor is of the piston type, and means for providing a bypass between opposite sides of said piston of one section while another section is controlled by the pressure from the auxiliary means.

10. The apparatus of claim 7 wherein the pressure from the auxiliary means is modified by the operation of an electrohydraulic valve responsive to control signals.

11. The apparatus of claim 3, wherein the auxiliary means includes means maintaining substantially constant fluid pressure during check out or preflight tests of said servomotor.